UNITED STATES PATENT OFFICE.

OSCAR FALKE AND PHILIP SCHRAG, OF NEW YORK, N. Y., ASSIGNORS TO THEMSELVES AND THOS. A. JENCKES, OF PROVIDENCE, RHODE ISLAND.

IMPROVED FABRIC MANUFACTURED FROM CAOUTCHOUC, &c.

Specification forming part of Letters Patent No. 42,533, dated April 26, 1864; antedated April 12, 1864.

*To all whom it may concern:*

Be it known that we, OSCAR FALKE and PHILIP SCHRAG, both of the city and county and State of New York, have invented a new and useful Improvement in the Manufacture of India-Rubber and Gutta-Percha; and we do hereby declare that the following is a full and exact description thereof.

It is well known to every one acquainted with the manufacture of india-rubber and gutta-percha fabrics that two distinct processes are employed for the purpose of producing what is commonly termed "vulcanization," and that two distinct products or results are obtained by the use of such processes.

The invention of Charles Goodyear, for which a patent was issued to him on the 15th day of June, A. D. 1844, and reissued on the 25th day of December, A. D. 1849, and extended on the 14th day of June, A. D. 1858, and again reissued in two patents on the 20th day of November, A. D. 1860, was for the subjection of india-rubber combined with a small proportion of sulphur and a greater or less proportion of other matter—such as the salts or oxides of lead, zinc, and other mineral substances—to a higher degree of heat, and also as the result of the use of this process, the product which is known in commerce and the arts as "vulcanized soft rubber," with varying degrees of compressible and extensible elasticity, suitable for packing, belting, car-springs, clothing, and other purposes.

The invention of Nelson Goodyear, for which a patent was issued to him on the 6th day of May, A. D. 1851, and reissued in two patents to his administrator, Henry B. Goodyear, on the 18th day of May, A. D. 1858, was for the subjection of india-rubber or gutta-percha combined with sulphur, in the proportion of one pound of india-rubber or other vulcanizable gum with from four ounces to one pound of sulphur, and with or without other ingredients—such as magnesia or lime, and the carbonates or sulphates of either—to a high degree of heat, and also, as the result of the use of this process, the product, which is a hard compound similar in its properties to horn or ivory, and suitable for combs, buttons, canes, and other purposes.

Our invention consists in the productions of a new substance different from the substances produced by either of the processes referred to, and which is the result of a combination of matter hitherto unknown.

We mix the rubber or gutta-percha, after it is cleaned and dried in the usual way known to all manufacturers of these articles, with sulphur, in the proportion of from two and a half to three and three-quarters ounces of sulphur to one pound of rubber, gutta-percha, or other vulcanizable gum, this being a larger proportion of sulphur than is required in using the invention of Charles Goodyear and a less quantity than is required for using the invention of Nelson Goodyear; and for the purpose of giving toughness, cohesion, and consistency to the compound we add thereto some fibrous vegetable substances—such as hemp or flax and other vegetable fiber and vegetable oil—the quantity depending upon the degree of toughness required in the fabric; and to increase the bulk and to lessen the specific gravity of the fabric, we add fine flour made from wheat or rye, rice, or any other grain, in such proportions as may be desired. These substances are combined in the manner well known to manufacturers of india-rubber. The compound is then subjected to the action of a high degree of heat and the ordinary steam-heater, or by molding and curing it at the same time within molds surrounded by steam.

The product obtained in this operation is entirely different from any yet obtained by other processes, being similar to leather and suitable to be used as a substitute for it, and also being capable of uses for which both the hard and soft compound of india-rubber and gutta-percha are unsuitable.

Having thus fully described our invention, what we claim, and desire to secure by Letters Patent, is—

The new manufacture or substance hereinabove described and possessing the substantial properties herein described, and composed of india-rubber, gutta-percha, or other vulcanizable gum and sulphur, in the proportions substantially such as described, and when incorporated subjected to a high degree of heat, as set forth, and whether other ingredients be or be not used in the preparation of the manufacture, as herein described.

OSCAR FALKE.
PHILIP SCHRAG.

Witnesses to the signature of Oscar Falke:
  FRED. S. VANDERPOOL,
  B. B. HAMMOND.
Witnesses to the signature of Philip Schrag:
  AUGUSTE WEILLER,
  B. W. FLOTO.